Patented Sept. 2, 1952

2,609,361

UNITED STATES PATENT OFFICE 2,609,361

RESINOUS PRODUCTS CONTAINING CHLORO-ISOPROPENYL-TOLUENE

Gerson S. Schaffel, Cuyahoga Falls, Ohio, assignor to The General Tire and Rubber Company, Akron, Ohio, a corporation of Ohio No Drawing. Application April 22, 1948, Serial No. 22,705

12 Claims. (Cl. 260—80.5)

The present invention relates to resinous copolymers comprising a nuclear-chlorinated isopropenyltoluene and capable of withstanding relatively high temperatures without softening. It particularly relates to a styrene base resin having high heat distortion temperature as well as good physical properties.

Polystyrene and most resinous material soften below or so near the boiling point of water that they cannot be used for many commercial applications, especially those where they are apt to be contacted with hot water. Other resins which do not soften below the boiling point of water are highly absorptive to water and tend to crack or deteriorate when maintained in prolonged contact with water, particularly at elevated temperatures.

In the copending application of Gustave B. Bachman and Henry M. Hellman, Serial No. 22,728 filed on even date herewith, there is described an alpha-methylstyrene derivative designated as 3-chloro-4-methyl-alpha-methylstyrene prepared by alkylating orthochlorotoluene with propylene chlorhydrin and dehydrohalogenating the product. This alpha-methylstyrene derivative has, as mentioned by Bachman & Hellman, heretofore been found to copolymerize very slowly en masse with styrene, but the resinous copolymers formed prior to the present invention have not had any exceptional properties and in fact have extreme friability.

In the copending applications of Gilbert H. Swart and Guido H. Stempel, Jr., Serial No. 22,706 of even date herewith and entitled "Method of Making 3-Methyl-4-Chloro-Alpha-Methylstyrene" and "Alpha-Methylstyrene Derivatives and Method of Making Same," also assigned to the same assignee as is the present invention, there is disclosed 3-methyl-4-chloro-alpha-methylstyrene.

I have found that 3-methyl-4-chloro-alpha-methylstyrene also copolymerizes with monovinyl compounds having a monomer reactivity for copolymerization greater than vinyl chloride (has greater tendency to copolymerize than does vinyl chloride). Swart & Stempel also disclose in the above-mentioned application a commercial method for making 4-chloro-3-methyl-alpha-methylstyrene and 3-chloro-4-methyl-alpha-methylstyrene both separately and in admixture with each other.

It is an object of the present invention to provide copolymers of a mixture of one or more 4-chloro-3-methyl-alpha-methylstyrene and 3-chloro-4-methyl-alpha-methylstyrene with styrene, which copolymers have a high heat distortion point and other desirable physical properties.

It is another object of the present invention to provide copolymers of at least one of the aforementioned nuclearly chlorinated isopropenyltoluenes with styrene and/or other polymerizable mono-olefinic compounds, which copolymers are resistant to heat and boiling water.

Although the styrene compounds with the same nuclear substituents in the same nuclear positions relative to the olefinic group readily copolymerize in aqueous emulsion with methyl methacrylate, acrylonitrile, styrene and various other mono-olefinic compounds, I have been unable in aqueous emulsion to copolymerize with any of the common monomeric materials the 2-chloro-3-methyl-alpha-methylstyrene, the 2-methyl-3-chloro-alpha-methylstyrene, the 2-methyl-4-chloro-alpha-methylstyrene, or the 2-methyl-6-chloro-alpha-methylstyrene. I have found, however, that the two remaining isomers 3-methyl-4-chloro-alpha-methylstyrene and 4-methyl-3-chloro-alpha-methylstyrene readily copolymerize in aqueous emulsion (dispersed in water containing an emulsifying agent) with one or more mono-olefinic compounds, such as styrene. These latter two ring-substituted alpha-methylstyrenes, or nuclear-chloroisopropenyl-toluenes as they are sometimes called, have the nuclear carbon atoms next adjacent that carrying the isopropenyl group connected to hydrogen and thus free of substituents. They impart especially desirable properties to the copolymer when the monomers are proportioned so that there is present at least 9½ or 10 mol percent and not appreciably in excess of 65 mol percent of one or both of these two copolymerizable chloroisopropenyltoluenes in the total polymerizable and copolymerizable materials, i. e. there should be at least 1 mol of one or more of the aforementioned chloroisopropenyltoluenes for each 10 mols to .5 mol of other copolymerizable constituents, such as styrene. Superior results are had when there is 1 mol for each 1 to 5 mols of other copolymerizable monomeric materials consisting essentially of a polymerizable mono-olefinic compound, such as styrene.

Some of the above chloroisopropenyltoluenes may be substituted by other alpha-methylstyrenes which contain nuclear substituents such as one or two halogen atoms but which have the 2- and 6-nuclear positions unsubstituted.

When, however, the nuclearly substituted alpha-methylstyrenes (including the above chloroisopropenyltoluenes in amounts of at least 10 mol percent of the monomer) amount to 50 mol percent of the total copolymerizable monomeric materials, I have found that the heat distortion point considered with remaining properties, such as tensile and flexural strengths of the copolymer, is about optimum. When the component is increased above 50%, heat distortion of the copolymer produced is somewhat greater, especially when the alpha-methylstyrene contains a substantial amount of the compounds containing parachlorine, but above 50 or 60 mol percent properties of the copolymer produced generally become much inferior. This may be because these alpha-methylstyrenes appear to copolymerize or combine avidly with no more than an equal number of mols of other polymerizable mono-olefinic compounds. Some of the excess above this value may remain in the polymer as a copolymer of somewhat lower molecular weight to decrease structural strength although increasing heat distortion to a slight extent.

Of the aforementioned nuclearly chlorinated isopropenyltoluenes, 4-chloro-3-methyl-alpha--methylstyrene gives with styrene and certain mono-olefinic compounds, as hereafter described, copolymers that are superior to those produced with the 3-chloro-4-methyl-alpha-methylstyrene as the sole alpha-methylstyrene constituent. The latter material, however, is highly effective, compared to most known styrene copolymerizable materials, in providing mono-olefinic copolymers with highly desirable properties.

While styrene is preferred as the sole copolymerizing agent, with the aforementioned 4-chloro-3-methyl-alpha-methylstyrene and/or the 3-chloro-4-methyl-alpha-methylstyrene, highly desirable copolymers in emulsion are also obtained when part or all of the styrene is substituted by another monomeric mono-olefinic compound having the general formula $$CH=C-Z$$
$$\;\;\;|\;\;\;\;|$$
$$\;\;\;X\;\;\;Y$$

where X is selected from the group consisting of alkyl, aralkyl, aryl (including substituted aryl where substituents are selected from halogen, cyano, alkyl, and alkoxy) and hydrogen, Z is selected from phenyl (including monochlorphenyl and dichlorphenyl), —CN, —C(O)R, —COOR where R is selected from alkyl and phenyl (including substituted phenyl), thienyl, and pyridyl, Y is selected from hydrogen and methyl, and X and Y are hydrogen in all cases when Z is a cyclic group such as phenyl (including substituted phenyl as well as hydrocarbon phenyl).

The above general formula includes compounds containing the acrylate grouping

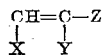

where L is hydrogen or methyl and where T is —CN or —COOR (where R is allyl, phenyl, or substituted phenyl including chlorinated phenyl.)

It also includes the styrene type class of compound

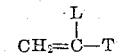

where M is an organic group selected from the group consisting of thienyl, pyridyl, and aryl group such as phenyl (including all isomers of monochlorophenyl, all isomers of dichlorophenyl tolulyl, alkoxyphenyl, trifluoromethylyhenyl, fluorophenyl, and cyanophenyl).

Furthermore, it includes the cinnamic compounds having the general formula

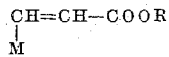

where M is a phenyl including all isomers of monochlorophenyl dichlorophenyl alkoxylphenyl.

Most of the aforementioned monomeric materials contain only one activating group for the olefinic group. Activating groups are groups supplying or removing electrons, i. e. groups in resonating relation with the double bond of the olefin.

Examples of materials which may be copolymerized in aqueous emulsion with the above substituted alpha-methylstyrenes, which materials may be substituted for all or part of the preferred styrene in the copolymers of the present invention, are acrylic and methacrylic acid esters, preferably methyl methacrylate, acrylo and methacrylonitriles, any of the various dichlorostyrenes having hydrogen connected to the alpha carbon atom, any of the monochlorostyrenes having hydrogen in the alpha carbon atom, vinyl methyl ketone, fumaryl dinitrile, methyl isopropenyl ketone, etc. It is preferred that the styrene be at least 20 or 25% of the total comonomers present that enter into copolymerization and that the aforementioned chloroisopropenyltoluenes be the main or sole alpha-substituted phenyl ethylene constituent. High heat distortion plastic materials having very desirable properties may as aforementioned also be obtained when part of the 3-chloro-4-methyl-alpha-methylstyrene and/or the 4-chloro-3-methyl-alpha-methylstyrene is substituted by other copolymerizable isopropenyl arylvinyl compounds (i. e. those having 2- and 6-positions on the nucleus free of substituents). At least 5 and preferably 10 or more mol percent of the total of either or both of the aforementioned nuclearly chlorinated isopropenyltoluenes should be present in the copolymerizable materials to obtain the advantages of the present invention, however.

In preparing the copolymers of the present invention, any of the emulsion polymerization systems suitable for the polymerization of butadiene and/or styrene may be utilized. Thus, one or more of the aforementioned styrene copolymerizable chloroisopropenyltoluenes may be mixed with the other polymerizable mono-olefinic materials in the desired proportions, the mixture agitated in a solution of emulsifying agent to maintain an emulsion until polymerization has progressed to the desired extent, usually about about 70 or 80% or more of the theoretical. Unless some high volatile materials such as a small portion of butadiene is present the polymerization container need not be equipped to withstand pressure. The product is obtained in the form of a latex (aqueous dispersion) of resinous copolymer which may be used directly for dipping fabric, paper etc., layers of which are then dried and compressed at high temperature (above the melting point of the copolymer), or may be coagulated by addition of electroylte such as an organic or inorganic acid, separated from aqueous medium, washed, dried and molded or used for coating compositions.

Emulsifying agents such as higher fatty acid soaps including sodium stearate and sodium oleate, lauryl alcohol sulfate, alkali resinates, particularly sodium or potassium salts (resinates) of dehydrogenated rosin acids, etc., may be used. A polymerization catalyst or accelerator of polymerization of the type adapted to produce free radicals is frequently desirable in the emulsion. Such accelerators include potassium persulfate, potassium perborate, benzoyl peroxide, cumene hydroperoxide and combinations of these compounds with alkali metal sulfinates of long chain acids, especially those of 12 to 14 carbon atoms, a small amount of dodecyl mercaptan or the like. Any of the polymerization recipes described in the copending application of John C. Warner and Harry Seltz, Serial No. 687,954 filed August 2, 1946, and assigned to the same assignee as the present invention, may be used to obtain desirable products by substituting a mixture of monomers of the present invention for the monomers in the Warner-Seltz application.

Where color is an important factor it is desirable that the polymerizing be accomplished in the absence of salts of a heavy metal. Polymers of higher strength are obtained in the absence of substantial amounts of a modifying agent such as long chain mercaptan which is capable of modifying (increasing the plasticity of synthetic rubbers such as butadiene-styrene copolymers when incorporated in the emulsion).

The temperature at which the emulsion is maintained determines the rate of copolymer formation in general accordance with the law of chemical reaction. Generally the temperatures of the emulsion is maintained above room temperature, particularly when the system is not highly activated. Polymerization temperature of about 50° C. to 80° C. or 90° C. are ordinarily used.

The following examples in which parts are by weight illustrate the present invention:

*Example 1*

| | Parts |
|---|---|
| 4-chloro-3-methyl-alpha-methylstyrene | 15 |
| Styrene | 85 |
| Water | 180 |
| Potassium persulfate | .3 |
| Emulsifying agent (sodium stearate) | 5 |

The styrene and 4-chloro-3-methyl-alpha-methylstyrene were mixed together and incorporated into the water containing the persulfate and soap dissolved therein, and agitated in an enclosed vessel at 50° C. for about 20 hours. The latex obtained in this period was steam distilled to remove any unpolymerized materials, coagulated with acetic acid, filtered from aqueous fluid, washed and dried at about 100° C. The polymer was molded into test bars which showed a heat distortion, as measured in accordance with A. S. T. M. methods, of 103° C.

When in the above example the ratio of the weight of styrene to the weight of chloro-isopropenyltoluene was successively changed to 80:20; 65:35; 40:60; and 30:70 total weights of monomeric materials and other conditions remaining the same, the respective A. S. T. M. heat distortions of the test bars produced were 105° C.; 113° C.; 117° C. and 122° C. The flexural strength of all copolymers was high but that of the polymer prepared with 70% of the 4-chloro-3-methyl-alpha-methylstyrene was somewhat lower than that of the polymers produced with 50% and 60% of the chloroisopropenyltoluenes is the monomeric materials.

When in Example 1, one-half of the 4-chloro-3-methyl-alpha-methylstyrene is substituted by about 50% of 3-chloro-4-methyl-alpha-methylstyrene, other conditions remaining the same, the heat distortion obtained is only a little lower than that obtained by equal amounts of the 4-chloro-3-methyl-alpha-methylstyrene alone. When all of the 4-chloro-3-methyl-alpha-methylstyrene is substituted by 3-chloro-4-methyl-alpha-methylstyrene other conditions remaining the same, a high strength copolymer is also produced.

*Example 2*

In Example 1 the styrene is substituted in each instance by an equal molar quantity of acrylonitrile. The copolymer produced in each instance has a very high melting point, and very high heat distortion. These copolymers may be plasticized with rubbery copolymers of butadiene and methylisopropenyl ketone or with rubbery copolymers of butadiene and acrylonitrile to produce rubbery plastic materials similar in nature to plasticized polyvinyl chloride. The plasticization may be accomplished by milling the two materials together at elevated temperature, i. e., a temperature above the softening point of the styrene copolymer.

In the above examples styrene may be substituted in whole or in part by any one or more of the aforementioned monomeric materials included within the above general formula and including methylmethacrylate, acrylonitrile, monochlorostyrenes and dichlorostyrenes, paramethylstyrene, methyl vinyl ketone, etc. to produce resins also having high strength, high melting point and high hardness.

The chloro-isopropenyltoluene may be substituted in part by other nuclear derivatives of alpha-methylstyrene having hydrogen directly attached to the 2 and 6 positions and including parachloro-alpha-methylstyrenes, 3,4- and/or 3,5- dichloro - alpha - methylstyrene, 4, - (trifluoro methyl) alpha-methylstyrene, parafluoro-alpha-methylstyrene, 4-bromo-3-methyl-alpha-methylstyrene and/or 3-bromo-4-methyl-alpha-methylstyrene to also obtain very high heat distortion polymers of high quality provided the total amount does not substantially exceed 60 mol per cent of the total monomeric materials entering into the copolymer. In case styrene is the sole comonomer the nuclearly substituted alpha-methylstyrenes present should not exceed 70% of the monomeric materials and should not be less than 15% (about 10 mol percent).

While the copolymers in mass, such for example, as the mass copolymers of styrene or methyl methacrylate, etc., with 3-chloro-4-methyl-alpha-methylstyrene and/or 4-chloro-3-methyl - alpha - methylstyrene are extremely frangible, so frangible after separation of residual monomer, etc., that I have been unable to remove the mass copolymer from the forming mold, the emulsion copolymers of the present invention have relatively high flexural strength combined with high heat distortion.

In my application about to be filed, there is described a method of utilizing frangible mass copolymers of styrene and/or acrylonitrile, or other mono-olefinic compounds aforementioned) with 3 - chloro - 4 - methyl - alpha - methylstyrene and/or 4-chloro-3-methyl-alpha-methylstyrene which method is based on my discovery that a small amount, say 5 or 10% or so of plasticizer may be incorporated into mass copolymers to improve structural and flexural strength A small amount of plasticizer may also be incorporated with the emulsion copolymers of the present invention although such are not necessary for flexural and tensile strengths. A small amount of butadiene or other conjugated diolefine, say up to 10 or 20 or even 25% may also be incorporated with the polymerizable materials for plasticization.

The plastic materials of the present invention have exceptional properties and may be used for any purpose where high heat distortion plastics are desirable. They have excellent electrical characteristics and therefore will probably have wide application to the electrical industry. They remain thermoplastic thus they have much advantage over thermosetting resins in that waste may be utilized over and over again and short molding cycles may be used. They are more satisfactory for use at higher temperatures than are most thermosetting resins. While in latex form or in form of solutions in aromatic solvents they may be used for coatings, etc.

In the claims the term chain units from chloro-isopropenyltoluene designates the grouping $$-\underset{\underset{C_7H_6Cl}{|}}{\overset{\overset{CH_3}{|}}{C}}-CH_2-$$

where $C_7H_6Cl$ is the nuclear chloro-toluene group.

In the claims, the term "acrylic compound" designates acrylic and methacrylic esters and nitriles.

Although the invention may be employed in various ways, only preferred embodiments have been illustrated and described. Other embodiments may be made within the invention as provided by the patent statutes.

What I claim is:

1. An emulsion copolymer of a mixture of monomeric materials comprising styrene and a nuclear monochloro-isopropenyltoluene having both of the carbon atoms next adjacent that carrying the isopropenyl group free of substituents, said copolymer containing at least 10 mol percent and up to 60 mol percent of chain units from chloro-isopropenyltoluene which units have the general formula $$-\underset{\underset{C_7H_6Cl}{|}}{\overset{\overset{CH_3}{|}}{C}}-CH_2-$$

2. An emulsion copolymer of a mixture of monomers comprising at least one nuclear monochloro-isopropenyltoluene, having the 2 and 6 nuclear positions unsubstituted, and a mono-olefinic compound within the general formula $$CH_2=\underset{\underset{Y}{|}}{C}-Z$$

Z is an activating group selected from the group consisting of phenyl, CN, —C(O)R and —COOR, where R is selected from the group consisting of alkyl and phenyl, Y is selected from the group consisting of hydrogen and methyl, and Y is hydrogen in all cases when Z is a phenyl, said copolymer containing at least 10 mol percent to 60 mol percent of chain units from the said chloro-isopropenyltoluenes.

3. An emulsion copolymer of 4-chloro-3-methyl-alpha-methylstyrene and styrene, said copolymer containing 10 to 60 mol percent of alpha-methylstyrene substituted in the nucleus by both a chlorine and a methyl group and being further characterized by having both of the carbon atoms next adjacent that carrying the isopropenyl group connected to hydrogen.

4. An emulsion copolymer of 3-chloro-4-methyl-alpha-methylstyrene and styrene, said copolymer containing 10 to 60 mol percent of alpha-methylstyrene substituted in the nucleus by both a chlorine and a methyl group and being further characterized by having both of the carbon atoms next adjacent that carrying the isopropenyl group connected to hydrogen.

5. An emulsion copolymer of a nuclear monochloroisopropenyltoluene, having the 2 and 6 nuclear positions unsubstituted, and an acrylonitrile, said copolymer containing at least 10 mol percent of chain units of said monochloro-isopropenyltoluenes.

6. The product of claim 5 wherein the chloro-isopropenyltoluene is 10 mol percent to about 60 mol percent of the polymerized ingredients.

7. A resinous emulsion copolymer of a mixture of monomers comprising styrene, 4-chloro-3-methyl-alpha-methylstyrene and 3-chloro-4-methyl-alpha-methylstyrene, said alpha-methylstyrene being from 10 mol percent to 60 mol percent of the total polymerized monomeric materials forming said copolymer.

8. A method of preparing resinous copolymerization products which comprises emulsifying in aqueous emulsion at least one of the two nuclear monochloro-isopropenyltoluenes, having the 2 and 6 nuclear positions free of substituents, and a monomeric material having the general formula $$CH_2=\underset{\underset{Y}{|}}{C}-Z$$

where Z is an activating group selected from the group consisting of phenyl, —CN, —C(O)R and —COOR, where R is selected from the group consisting of alkyl and phenyl, Y is selected from the group consisting of hydrogen, and methyl, and Y is hydrogen in all cases where Z is phenyl maintaining the materials in emulsion with agitation until an aqueous dispersion of resinous copolymer is produced, separating the dispersion from the aqueous fluid, and washing and drying the products, the said monochloro-isopropenyltoluenes in said emulsion being from 10 to 60 mol percent of the total polymerizable constituents thereof.

9. A method of making a resinous copolymer of at least one of the two nuclear monochloro-isopropenyltoluenes having the 2 and 6 positions connected directly to hydrogen and acrylonitrile, which comprises emulsifying these monomeric materials in aqueous medium, agitating the mixture at a polymerization temperature to produce an aqueous dispersion of a resinous copolymer, and separating the resinous material from the major portion of the water, the amount of said isopropenyltoluenes being 10 to 60 mol percent of the total copolymerizable constituents of said emulsion.

10. A method of making an emulsion copolymer of a mixture of mono-olefinic monomers comprising styrene and at least one of the two nuclear monochloro-isopropenyltoluenes, having the 2 and 6 positions connected to hydrogen which comprises agitating a mixture of these monomeric materials in water containing an emulsifying agent, maintaining the emulsion until polymerization has progressed sufficiently to provide an aqueous dispersion of resinous copolymer, and separating said copolymer from aqueous fluid, the amount of said monochloro-isopropenyltoluenes being from 10 to 60 mol percent of the polymerizable constituents of said mixture.

11. A resinous emulsion copolymer of a mixture of monomers, one of which is a polymerizable acrylic compound, and another of which is a nuclear monochloro-isopropenyltoluene having the 2- and 6-nuclear positions unsubstituted, the amount of nuclear monochloro-isopropenyltoluene having the 2- and 6-nuclear positions unsubstituted being 10 mol percent to 60 mol percent of the monomeric materials in said copolymer.

12. An emulsion copolymer of methyl methacrylate and a nuclear monochloro-isopropenyltoluene having the 2- and 6-positions unsubstituted, said copolymer containing 10 mol percent to 60 mol percent of chain units from monochloro-isopropenyltoluenes.

GERSON S. SCHAFFEL.

REFERENCES CITED

The following references are of record in the file of this patent:

UNITED STATES PATENTS

| Number | Name | Date |
|---|---|---|
| 2,439,213 | Kispersky et al. | Apr. 6, 1948 |
| 2,443,217 | Amos et al. | June 15, 1948 |